Figure 1:
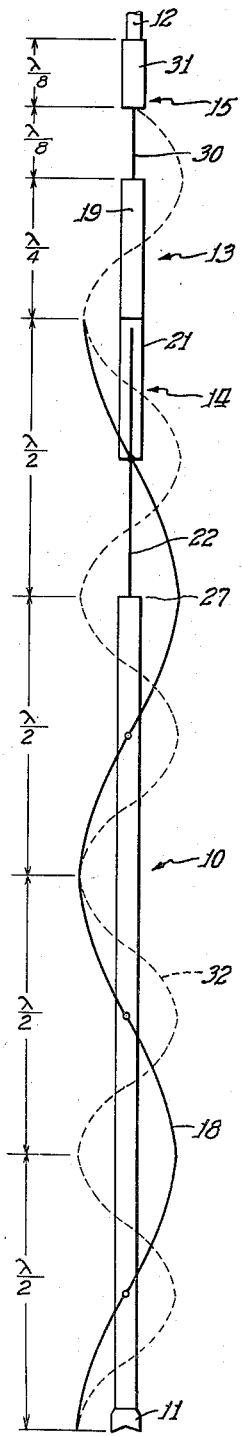

June 20, 1961  A. A. MATHEWSON, JR., ET AL  2,989,130
ISOLATOR FOR SONIC EARTH BORING DRILL
Filed Jan. 23, 1958  2 Sheets-Sheet 1

Inventors:
Arthur A. Mathewson Jr.
John P. Selberg and
Robert W. Leonard
By: Frank C. Parker
Atty.

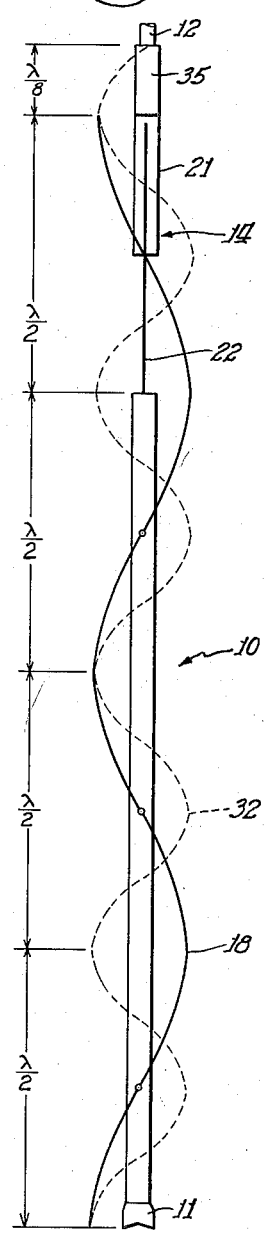
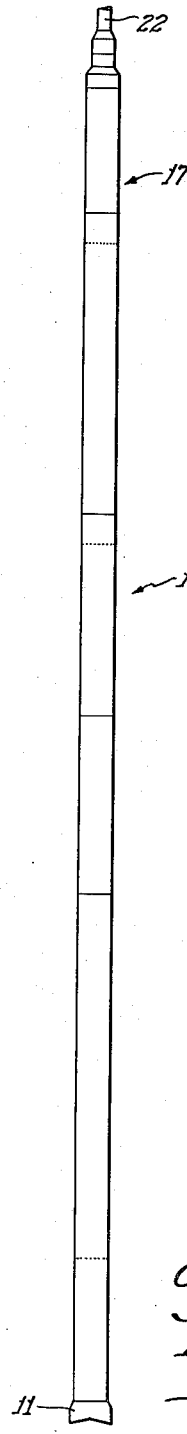
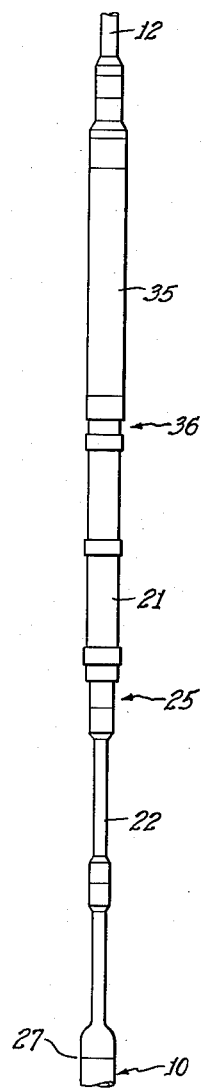

United States Patent Office 2,989,130
Patented June 20, 1961

2,989,130
ISOLATOR FOR SONIC EARTH BORING DRILL
Arthur A. Mathewson, Jr., La Canada, and John P. Selberg and Robert W. Leonard, Los Angeles, Calif., assignors, by mesne assignments, to A. G. Bodine, doing business as Bodine Soundrive Company, Los Angeles, Calif.
Filed Jan. 23, 1958, Ser. No. 710,700
1 Claim. (Cl. 175—56)

The present invention relates generally to earth bore drilling and is more particularly concerned with an isolator for acoustically isolating a sonically vibratory earth boring drill from its supporting drill string.

The patent to A. G. Bodine No. 2,554,005 illustrates one form of a sonic drill of the type to which the isolator devices comprising the subject matter of the invention disclosed herein are particularly applicable. In said sonic drill disclosed in this A. G. Bodine patent, the drill comprises an elongated massive drill rod having a bit disposed at the bottom or leading end thereof, with the drill rod incorporating oscillator means for imparting sonic vibrations to the rod, and means comprising a drill string for supporting the massive drill rod, oscillator and bit within an earth bore to be drilled. In the form of the sonic drill disclosed in said Bodine patent, the massive elongated drill rod is of such a length and mass that it vibrates in a half wave length standing wave mode at the resonant vibration frequency of the drill rod. The vibration frequency is of the order of 100 cycles per second.

In other forms of sonic earth boring drills, the length and mass of the massive vibratory drill rod are so selected that when the drill rod vibrates at its resonant vibration frequency it vibrates in either a full wave length or in a one and one half wave length mode. For the purposes of the present invention the particular mode of vibration is not critical, as the invention is applicable to any sonic drill of the type which may be described acoustically as a "free-free" drill. By a "free-free" drill, system, bar or column, is meant a drill, system, bar or column, where velocity anti-nodes occur at the upper and lower ends of the drill rod assembly.

Inasmuch as the amplitude of elongation of the upper end of the drill rod assembly is substantially equal to the amplitude of elongation of the lower end thereof at the bit, it is readily understood that some means of acoustically isolating the drill rod assembly from its supporting drill string must be provided.

The co-pending application of A. G. Bodine, S/N 611,131, filed September 21, 1956, now Patent No. 2,903,242, discloses several forms of devices for acoustically isolating a supporting drill string from a vibratory massive drill rod; however, this application is limited to such isolator devices effective only for isolating the supporting drill string from the resonant drilling frequency. During operation of a sonic earth boring drill, the drilling bit encounters rocks and the bit, as well as the drill rod, are subject to any number of different stresses which generate overtones which are capable of causing the drill rod to vibrate in a standing wave mode at the frequency of such overtones. Actually, it has been found from practice that the only overtone which is of such a magnitude and is so undesirable as to cause undue vibration of the supporting drill string when the overtone vibrations are transmitted thereto, is the first even harmonic of the resonant drilling frequency.

The principal object of the present invention is therefore to provide isolating means adapted to be operatively disposed between a sonically vibratory earth bore drill and its supporting drill string, which isolator is capable of not only preventing the transmission of the resonant vibrations from the drill rod to the supporting drill string but also of preventing the transmission of vibrations corresponding to the second harmonic of said resonant vibration frequency.

A more detailed object of the present invention is to provide an isolator assembly comprising a first device adapted to be connected directly with the vibratory drill rod for preventing the transmission upward of vibrations at the resonant vibration frequency and a second isolator device connected in tandem with the first and effective to prevent the transmission upward to the supporting drill string of vibrations corresponding to the second harmonic of the resonant vibration frequency.

More particularly, it is an object of the present invention to provide such acoustic isolator devices adapted for use with a sonic drill assembly wherein the drill rod and bit thereof vibrate in resonance in a standing one and one half wave length mode.

The forms of the isolator assemblies disclosed herein have been found in practice to be particularly effective in isolating the supporting drill string from the resonant drilling vibrations of the drill rod as well as from the second harmonic vibrations which may be induced in the drill rod by any causes. Further, the device disclosed particularly in the second embodiment of the invention is desirable by reason of its compactness, which facilitates transportation and other handling thereof.

Figure 2A:
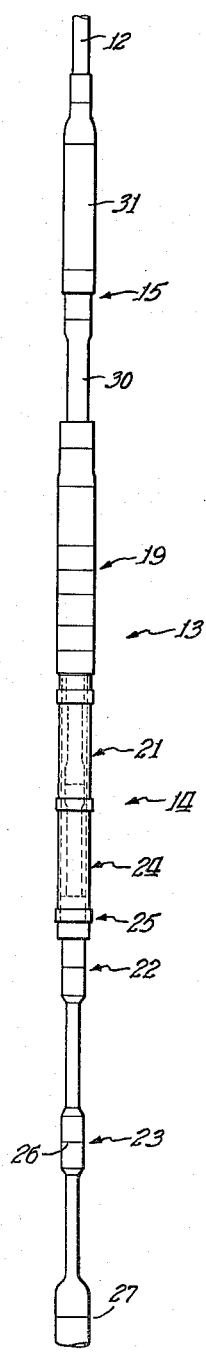
Figure 2B:
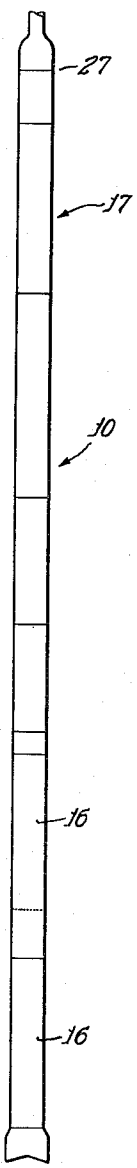
Figure 3:
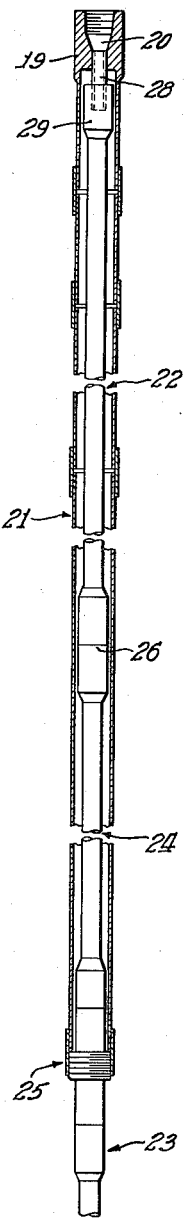

The foregoing objects and advantages as well as others will become more apparent from the following detailed description when read in conjunction with the accompanying drawings, wherein:

FIG. 1 comprises a schematic view of a first form of the invention as applied to a sonic drill adapted to resonate in a one and one half wave length standing wave mode;

FIGS. 2A and 2B, when taken together, disclose the general structural details of the isolator and drill rod assembly shown in FIG. 1;

FIG. 3 shown partly in section, illustrates further structural details of the isolator means which prevents the transmission upward from the drill rod to the supporting drill string of vibrations at the resonant vibration frequency;

FIG. 4 is a schematic view illustrating a second embodiment of the invention; and FIGS. 5A and 5B, when taken together, comprise more detailed plan views illustrating the structural details of the form of the invention shown in Fig. 4.

With reference now to the drawings, wherein like reference numerals have been used in the different views to identify identical parts, and particularly referring to the first embodiment of the invention shown in FIGS. 1, 2A and 2B, a sonic drill comprising a massive elongated drill rod, indicated generally by reference numeral 10, is provided with a drilling bit 11 at the lower, leading or penetrating end thereof and the drill rod assembly 10 and bit 11 are suspended in an earth bore (not shown) by means of a supporting drill string, only the lower end of which is shown and which is represented by reference numeral 12. The supporting drill string is adapted to be suspended from any suitable derrick means located at the surface of the earth at the top of the bore in the earth to be formed by the drill. Disposed between the vibratory drill rod assembly 11 and the supporting drill string 12 is the isolator means 13 comprising the subject matter of the present invention. The isolator means 13 consists of two parts 14 and 15, respectively adapted to prevent the transmission of resonant drilling frequently vibrations and second harmonic vibrations from the drill rod 10 to the drill string 12.

The drill rod assembly 10 comprises a plurality of lengths of drill collars 16 and at its upper end is provided with suitable means, designated only generally by reference numeral 17 for generating vibrations in the drill rod. The details of the oscillator or vibration generator 17 do not constitute any portion of the present invention and will therefore not be described in detail herein. The oscillator assembly such as is shown in the aforementioned patent to A. G. Bodine 2,554,005, could be used as well as any other suitable type of oscillator. The drill rod assembly 10 is so selected, that is, from the standpoints of its length and mass, that when the oscillator mechanism 17 takes energy from mud fluid pumped down through the supporting drill string 12 and through the isolator mechanism 13 and drill rod assembly 10, vibrations at a frequency of approximately 100 c.p.s. are induced in the drill rod assembly. Such vibrations cause the drill rod assembly to resonate as a free-free bar in a one and one half wave length standing wave mode. This resonant vibration frequency is represented schematically by the solid sine wave form designated by reference numeral 18. The bit 11 is disposed at a velocity anti-node of said frequency and the upper end of the drill rod 10 is likewise located at a velocity anti-node. Velocity nodes are respectively disposed at one quarter wave length $$\left(\frac{\lambda}{4}\right)$$

¾ wave length $$\left(3\frac{\lambda}{4}\right)$$

and one and one quarter wave length $$\left(5\frac{\lambda}{4}\right)$$

from the bit.

The isolator device 14 for preventing the transmission of resonant drilling frequency vibrations illustrated by reference numeral 18 from the drill rod assembly 10 to the drill string 12 will now be described. This isolator mechanism 14 comprises a massive bar 19, formed with a fluid circulation bore 20 and which massive bar is of one quarter wave length $$\left(\frac{\lambda}{4}\right)$$

of the resonant drilling vibration at which the drill rod assembly 10 vibrates. The massive bar 19 is coupled to a suspension sleeve 21, the lower end of which is threadedly connected with a relatively slender upstanding pipe column 22. The pipe column 22 comprises two portions 23 and 24 respectively disposed below the threaded connection 25 and above this threaded connection. The slender pipe column 22 may be formed of a plurality of lengths of slender drill pipe coupled together by means of suitable joints 26. The lower end of the slender pipe column 22 is connected directly to the upper end of the drill rod assembly 10 in a velocity anti-nodal region thereof, indicated by reference numeral 27.

The massive quarter wave length $$\left(\frac{\lambda}{4}\right)$$

bar 19 is formed with a central opening, as described, and a short length of pipe 28 is inserted into the opening 20 and projects downwardly, as a funnel, into the upper end 29 of the slender pipe column 22 in order to direct mud fluid passing downwardly through the massive bar 19 into the slender pipe column 22.

The slender pipe column 22 has an overall length equal to one half wave length $$\left(\frac{\lambda}{2}\right)$$

at the resonant drilling vibration frequency and this slender pipe coupling, being directly coupled to the upper end of the drill rod assembly 10, at 27, vibrates as a free-free bar in a half wave length standing wave mode, there being a velocity anti-nodal region at the upper end of the slender pipe column 22 and there being a velocity nodal region at the substantial mid-point of the pipe column 22, which midpoint is substantially at the point of connection between the pipe column 22 and the outer telescoping sleeve assembly 21.

During the operation of the sonic drill 10, that is, when it is vibrating at its resonant frequency in a one and one half wave length $$\left(3\frac{\lambda}{2}\right)$$

mode, the elastic suspension column comprising the slender inner telescopic member 22 vibrates also, at the same frequency, in a standing half wave length $$\left(\frac{\lambda}{2}\right)$$

mode, the lower end of the pipe section vibrating with the vertical vibration of the upper end portion of the sonic drilling assembly 10, its upper end vibrating equally and opposite thereto, and its center section (at the point of connection 25 with outer sleeve member 21) standing substantially stationary. The upper and lower halves of the slender pipe section 22 are therefore dynamically opposed to one another during the resonant vibration of the drilling assembly 10. The interconnected lower end portion of the slender pipe section 22 is at a velocity anti-node of the overall vibratory system, the upper end of the pipe section 22 is at another velocity anti-node of the system, and the intercoupled midpoint of pipe section 22 and the lower end of the velocity anti-node of the system, and the intercoupled midpoint of pipe section 22 and the lower end of the outer telescoping sleeve section 21 are at a velocity node of the system. Each velocity anti-node (stress node) is at low impedance region of the vibratory system and the midpoint of the pipe section 22 is at a region of high mechanical impedance of the system. The outer telescoping sleeve member 21 is somewhat flexible and elastic and is of substantially one-quarter wave length $$\left(\frac{\lambda}{4}\right)$$

of the resonant drilling frequency of the system. The sleeve member 21, being compliant and being interconnected with the inner pipe section 22 at a velocity node, is therefore effective to substantially reflect or eliminate the transmission of vibrations at the resonant drilling vibration frequency upward beyond the point of connection 25 and into the massive drill collar section 19 and the supporting drill string 12 above.

The massive drill collar section 19, being of substantially one quarter wave length $$\left(\frac{\lambda}{4}\right)$$

for the resonant drilling frequency, is, however, not effective in eliminating the transmission of undesirable overtones which are generated in the drill rod by reason of the bit 11 striking a rock, for example, or for any other reason. Nor are members 21 and 22 effective to eliminate the transmission of overtones. In fact, these are excellent transmitting of the even harmonics. For this purpose a second isolator device is connected above the isolator 14 and is tuned so as to prevent the transmission of vibration at the second harmonic frequency of the driving frequency. These second harmonic vibrations have a wave length of one half the wave length of the driving frequency, and accordingly, in the first embodiment of the invention, this isolator device comprises a first relatively slender elastically complaint pipe section 30, the length of which is equal to ⅛ wave length $$\left(\frac{\lambda}{8}\right)$$

for the driving frequency and which is connected at its lower end to the upper end of the massive drill collar section 19. At the upper end of the slender elastically compliant pipe section 30 it is connected to a massive bar or drill collar 31, also of ⅛ wave length $$\left(\frac{\lambda}{8}\right)$$

of the driving frequency. The slender pipe section 30 is a region of low mechanical impedance and the massive pipe section 31 is a region of high mechanical impedance.

The second harmonic vibrations induced in the system are represented by the dotted sine wave curve 32 which has an anti-node at the bit, and anti-node at the upper end of the drill rod 10, an anti-node at the juncture between the outer sleeve member 21 and the massive drill collar 19, an anti-node at the upper end of drill collar 19 and a node at the point of connection between the slender pipe section 30 and the massive pipe section 31. Because of the impedance mis-match, that is, the change from a low impedance region in the slender pipe section 30 to a high impedance region in the massive pipe section 31, and because this impedance mis-match occurs at a velocity node for the second harmonic frequency, the relatively non-compliant massive pipe section 31 serves as a rigid member substantially unaffected by the second harmonic vibrations and the two members 30 and 31 together are, therefore, effective to substantially isolate the supporting drill string 12 from the second harmonic vibrations generated in the drill rod assembly 10.

The second embodiment of the invention shown in FIGS. 4, 5A and 5B will now be described. Insofar as this embodiment of the invention is similar to the first form, no additional description will be given and the same reference numerals which have been applied to FIGS. 4, 5A and 5B as are used in FIGS. 1, 1A and 2B identify parts common to the two forms. In this connection, the first isolator device 14 in each of the two embodiments is similar, each comprising a slender pipe section 22 connected to the upper end of the drill rod 10 in a velocity anti-nodal region for the resonant vibration frequency and the outer telescopically disposed pipe section 21 connected at the midpoint 25 of the slender pipe section 22. The driving frequency isolator 14 in FIG. 4 therefore functions substantially like the driving frequency isolator 14 in FIG. 1 inasmuch as the slender pipe section 22 is free to vibrate as a free-free bar in a half wave length mode and the outer sleeve member 21 is connected to the pipe section 22 at a velocity node at point 25. The driving frequency isolator 14 is therefore substantially effective to eliminate the transfer of resonant vibrations from the drill rod 10 to the supporting drill string 12.

The secondary isolator for preventing the transmission of second harmonic frequency vibrations to the supporting drill string 12 comprises a massive drill collar section 35 connected directly to the upper end of sleeve section 22 by means of a drill collar joint 36, the massive drill collar section 35 being of high impedance to the first even harmonic vibrations represented by the sine wave curve 32. The drill collar section 35 is of ⅛ wave length $$\left(\frac{\lambda}{8}\right)$$

of the driving vibration frequency so that a velocity node for the second harmonic vibrations occurs at the upper end of the drill collar section 35. The drill string 12 is therefore directly connected at the velocity nodal section at the upper end of the drill collar 35. Thus, the mismatch in the impedance occuring at the velocity node at the top of drill collar section 35 is effective to isolate the supporting drill string from the second harmonic vibrations induced in the drill rod assembly 10 and transmitted to the drill collar section 35 through the first or driving frequency isolator 14.

The second form of the invention shown in FIGS. 4, 5A and 5B is somewhat preferable, even though somewhat less efficient in isolating the even harmonics, inasmuch as its overall length is less and the complete isolator assembly is therefore cheaper to manufacture and easier to transport and assemble.

It is contemplated that numerous changes and modifications may be made in the present invention without departing from the spirit or scope thereof.

What is claimed is:

An isolator for a sonic well drill which drill consists of a column system embodying a supporting drill string, a massive vibratory elastic drill rod connected to said drill string, a drilling bit coupled to the end of said rod, vibration generating means coupled to said drill rod for vibrating said drill rod and bit, said generating means being operable to produce a resonant elastic vibration frequency of said drill rod, said resonance being characterized by a standing wave pattern in said rod and in any adjacent drill string portion acoustically coupled thereto, and wherein said pattern has regions of minimum and maximum cyclic elastic movement providing high impedance and low impedance regions respectively within said rod and said portion, said pattern tending to have a second harmonic frequency component with a low impedance region in said pattern for said second harmonic frequency component, said isolator being coupled to said column system at a coupling point within said pattern, said isolator comprising a massive elastic column means having mass and elasticity giving a resonant frequency response for said second harmonic frequency component, said resonant frequency response having a region of minimum cyclic movement establishing a high impedance of said isolator column means at said low impedance region in said pattern for said second harmonic frequency component.

References Cited in the file of this patent
UNITED STATES PATENTS

| | | |
|---|---|---|
| 1,966,446 | Hayes | July 17, 1934 |
| 2,554,005 | Bodine | May 22, 1951 |
| 2,903,242 | Bodine | Sept. 8, 1959 |

FOREIGN PATENTS

| | | |
|---|---|---|
| 741,833 | Great Britain | Dec. 14, 1955 |